United States Patent [19]

Adachi et al.

[11] Patent Number: 5,757,102
[45] Date of Patent: May 26, 1998

[54] ROTATOR FOR DYNAMOELECTRIC MACHINE AND ITS MANUFACTURING METHOD

[75] Inventors: Katsumi Adachi; Kazunori Tanaka; Yoshihiro Shinosaka; Kyoko Kurusu, all of Tokyo, Japan

[73] Assignee: Mitsubishi Denki Kabushiki Kaisha, Tokyo, Japan

[21] Appl. No.: 640,074

[22] Filed: Apr. 30, 1996

[30] Foreign Application Priority Data

Dec. 13, 1995 [JP] Japan ................... 7-324859

[51] Int. Cl.$^6$ ............ H02K 1/04; H02K 15/00; H02K 1/22; H02K 21/00
[52] U.S. Cl. ............ 310/263; 310/263; 310/42; 310/45; 29/598; 29/596
[58] Field of Search ............ 310/263, 42, 45; 29/596, 598

[56] References Cited

U.S. PATENT DOCUMENTS

| | | | |
|---|---|---|---|
| 3,671,906 | 6/1972 | Hodges et al. | 336/208 |
| 4,604,538 | 8/1986 | Merril et al. | 310/68 D |
| 4,614,889 | 9/1986 | Ikegami et al. | 310/263 |
| 5,361,011 | 11/1994 | York | 310/194 |

FOREIGN PATENT DOCUMENTS

| | | | |
|---|---|---|---|
| 2421528 | 11/1975 | Germany | 310/51 |
| 19506162 | 9/1996 | Germany | 310/51 |
| 56-068246 | 6/1981 | Japan | 310/51 |
| 62-058848 | 3/1987 | Japan | 310/51 |
| 4325853 | 11/1992 | Japan | . |
| 4351452 | 12/1992 | Japan | . |
| 6-327203 | 11/1994 | Japan | 310/51 |
| 7-067300 | 3/1995 | Japan | 310/51 |

*Primary Examiner*—Steven L. Stephan
*Assistant Examiner*—Karl Tamai
*Attorney, Agent, or Firm*—Sughrue, Mion, Zinn, Macpeak & Seas, PLLC

[57] ABSTRACT

An object of the present invention is to provide a dynamoelectric machine that can be manufactured merely by adding simple work without the necessity of increasing the number of parts and that is characteristic of a minimized electromagnetic sound.

Included are a pair of field cores 12 having a plurality of claw-like magnetic poles 12a on the outer circumference thereof and being arranged so that the claw-like magnetic poles 12a can alternately mesh with one another, a coil frame 14 caught in the pair of field cores 12, a field coil 13 wound about the coil frame 14, and varnish layers 18 interposed between the field cores 12 and coil frame.

2 Claims, 16 Drawing Sheets

A TO F : VARNISH TYPES

ROTATOR FOR DYNAMOELECTRIC MACHINE AND ITS MANUFACTURING METHOD

BACKGROUND OF THE INVENTION

1. Field of the Invention

The present invention relates to a dynamoelectric machine such as a vehicle alternating current (hereinafter AC) generator to be mounted in a vehicle.

2. Description of the Related Art

FIG. 20 is a sectional view showing a known dynamoelectric machine. FIG. 21 is a sectional view showing a rotator for the known dynamoelectric machine. A dynamoelectric machine such as a vehicle AC generator comprises a rotator 1 and a stator 2. The rotator 1 includes a rotation axis 11 on which a belt that is not shown is put in order to drive the rotation axis by means of an internal combustion engine or the like in a vehicle. The rotator 1 further includes a pair of Lundell type field cores 12 having claw-like magnetic poles and being engaged with the rotation axis 11. The pair of Lundell type field cores 12 has claw poles 12a that are a plurality of claw-like magnetic poles extending along the outer circumferences of the field cores and being bent toward respective mates. The field cores 12 are opposed to each other so that the claw poles 12a can alternately mesh with one another. A field coil assembly 10 is caught internally in the opposed claw poles 12a.

The field coil assembly 10 comprises a field coil 13, a coil frame 14, and tapes 15a, 15b, and 15c. The coil frame 14 is an annular member having a square bracket-shaped section. The opening side of the square bracket-shaped section is slightly wider. The field coil 13 is wound about the coil frame 14. For constructing the field coil assembly 10, first, the inner-circumference tape 15a is wound about the bottom of the coil frame 14 having a square bracket-shaped section. Thereafter, the lateral side of the coil frame 14 at which the field coil 13 is started to be wound is protected by the lateral tape 15b. The field coil 13 is then wound until it reaches the upper margin of the coil frame 14. Finally, the outer-circumference tape 15c is wound.

The pair of field cores 12 presses the opening side of the square bracket-shaped section of the coil frame 14, catches and supports the coil frame 14 so that two lateral sides of the square bracket-shaped section of the coil frame 14 will be parallel to each other. The margin of the opening of the coil frame 14 presses the insides of the rising edges of the claw poles 12a. Cooling fans 16 that are internally caulked and laterally secured by projection welding are fixed to the lateral sides of the field cores 12.

The stator 2 comprises a stator core 21 placed along the outer circumference of the rotator 1 and a stator coil 22. The stator core 21 has a core tooth 21a formed along the inner circumference thereof. The core tooth 21a is opposed to the claw poles 12a of the rotator 1 with a very small gap between them.

A front bracket 3 and a rear bracket 4 define a container accommodating the rotator 1 and stator 2. The front bracket 3 and rear bracket 4 locks the stator 2 inside thereof, and rotatably support the rotator 1 via bearings 31 and 41.

In general, in a vehicle AC generator, a current is supplied from a battery that is not shown into the field coil 13. In this state, the rotator 1 is rotated. Consequently, a rotating magnetic field is developed on the stator core 21 with the very small gap between them. Eventually, a current conducts the stator coil 22.

In the known vehicle AC generator having the aforesaid structure, a magnetic attraction whose frequency is proportional to a rotating speed occurs in the very small gap between the stator core 21 and field cores 12, or more particularly, between the core tooth 21a and claw poles 12a. That is to say, the claw poles 12a is repeatedly attracted in a direction toward the core tooth 21a at a frequency proportional to a rotating speed and then released. The field cores 12 vibrate at the frequency proportional to a rotating speed. With the vibrations, the parts fixed to the field cores 12 resonant. A noise referred to as an electromagnetic sound occurs. Depending on a difference in natural vibration mode of the component parts of the rotator 1 from another parts, either a low-speed electromagnetic sound caused mainly by the stator at a low speed or a high-speed electromagnetic sound caused mainly by the rotator at a high speed occurs.

In the known vehicle AC generator, a ring 17 may be placed on the insides of the claw poles 12a as a countermeasure for minimizing the high-speed electromagnetic sound of the two electromagnetic sounds. By placing the ring 17, the rigidity of the claw poles 12a is improved and the resonant frequency is raised. Thus, the resonant frequency is shifted to the outside of the frequency band normally employed in the vehicle AC generator. Consequently, the high-speed electromagnetic sound is minimized during normal operation.

However, in the known vehicle AC generator, since the ring 17 is not fixed to the claw poles 12a, it does not fill the role of attenuating the motions of the pawls themselves. Moreover, the ring 17 cannot prevent vibrations of the whole field cores.

FIG. 22 is a graph indicating the noise of a vehicle AC generator having the ring 17 in decibels. The axis of abscissae denotes a rotating speed, and the axis of ordinates denotes a noise level in decibels. As shown in FIG. 22, in the vehicle AC generator having the ring 17, the emerging peak P of an electromagnetic sound is plotted in an area of higher rotating speeds than it is in a generator not having the ring 17. However, there is the peak P of an electromagnetic sound. In other words, when a rotating speed employed is high, a noise occurs. When an effort is made to meet the recent users' needs concerning vehicles, the rotating speed of a generator must be high. From this viewpoint, the effect of the ring 17 is not satisfactory.

The addition of the ring 17 contradicts the trend toward a reduction in the number of parts. Moreover, there are problems that an extra process must be included in manufacturing, a yield is poor, and cost is high.

SUMMARY OF THE INVENTION

An object of the present invention is to provide a-vehicle AC generator that can be manufactured merely by adding simple work without the necessity of increasing the number of parts and is characteristic of a minimized electromagnetic noise.

A rotator for a dynamoelectric machine set forth in claim 1 comprises a pair of field cores having a plurality of claw-like magnetic poles along the outer circumference thereof and being arranged so that the claw-like magnetic poles can alternately mesh with one another, a coil frame caught in the pair of field cores, a field coil wound about the coil frame, and varnish layers interposed between the field cores and field coil.

A rotator for a dynamoelectric machine set forth in claim 2 comprises a pair of field cores having a plurality of claw-like magnetic poles along the outer circumference thereof and being arranged so that the claw-like magnetic poles can alternately mesh with one another, a coil frame caught in the pair of field cores, a field coil wound about the coil frame, fans fixed to the lateral sides of the pair of field cores, and varnish layers interposed between the field cores and fans.

A rotator for a dynamoelectric machine set forth in claim 3 comprises a pair of field cores having a plurality of claw-like magnetic poles along the outer circumference thereof and being arranged so that the claw-like magnetic poles can alternately mesh with one another, a coil frame caught in the pair of field cores, a field coil wound about the coil frame, and a varnish layer placed on the outer circumference of the field coil.

In a rotator for a dynamoelectric machine set forth in claim 4, each varnish layer is formed with a cloth moistened with varnish.

In a rotator for a dynamoelectric machine set forth in claim 5, the varnish is of a type that has a Shore hardness ranging from 30 to 80 when hardened.

A method of manufacturing a rotator for a dynamoelectric machine set forth in claim 6 comprises a step of arranging a pair of field cores, which has a plurality of claw-like magnetic poles along the outer circumference thereof, so that the pair of field cores can catch a coil frame and the claw-like magnetic poles can alternately mesh with one another, a step of dripping varnish into gaps between the field cores and coil frame, and a step of hardening the varnish.

A method of manufacturing a rotator for a dynamoelectric machine set forth in claim 7 comprises a step of catching a coil frame in a pair of field cores, which has a plurality of claw-like magnetic poles along the outer circumference thereof and is arranged so that the claw-like magnetic poles can alternately mesh with one another, via cloths moistened with varnish, and a step of hardening the varnish moistening the cloths.

A method of manufacturing a rotator of a dynamoelectric machine set forth in claim 8 comprises a step of arranging a pair of field cores having a plurality of claw-like magnetic poles along the outer circumference thereof so that the pair of field cores can catch a coil frame about which a field coil is wound and the claw-like magnetic poles can alternately mesh with one another, a step of immersing the field cores in a varnish vessel so as to infiltrate varnish into gaps among the field coil, coil frame, and field cores, and a step of hardening the varnish.

DETAILED DESCRIPTION OF THE PREFERRED EMBODIMENTS

First Embodiment

Figure 1:
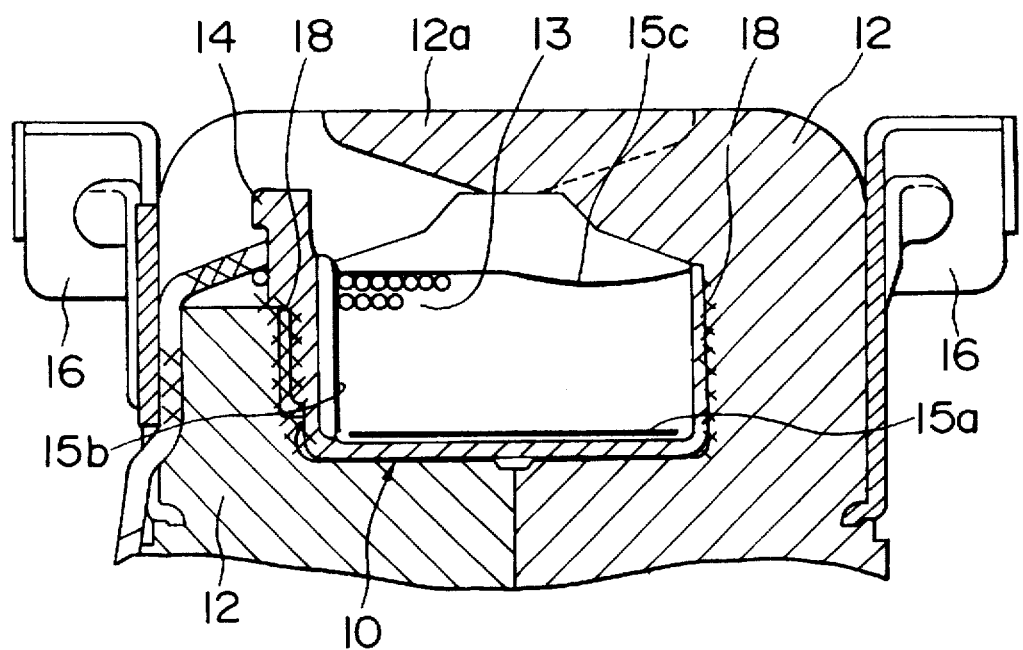
FIG. 1 is a sectional view showing a rotator for a dynamoelectric machine of the present invention.
Figure 20:
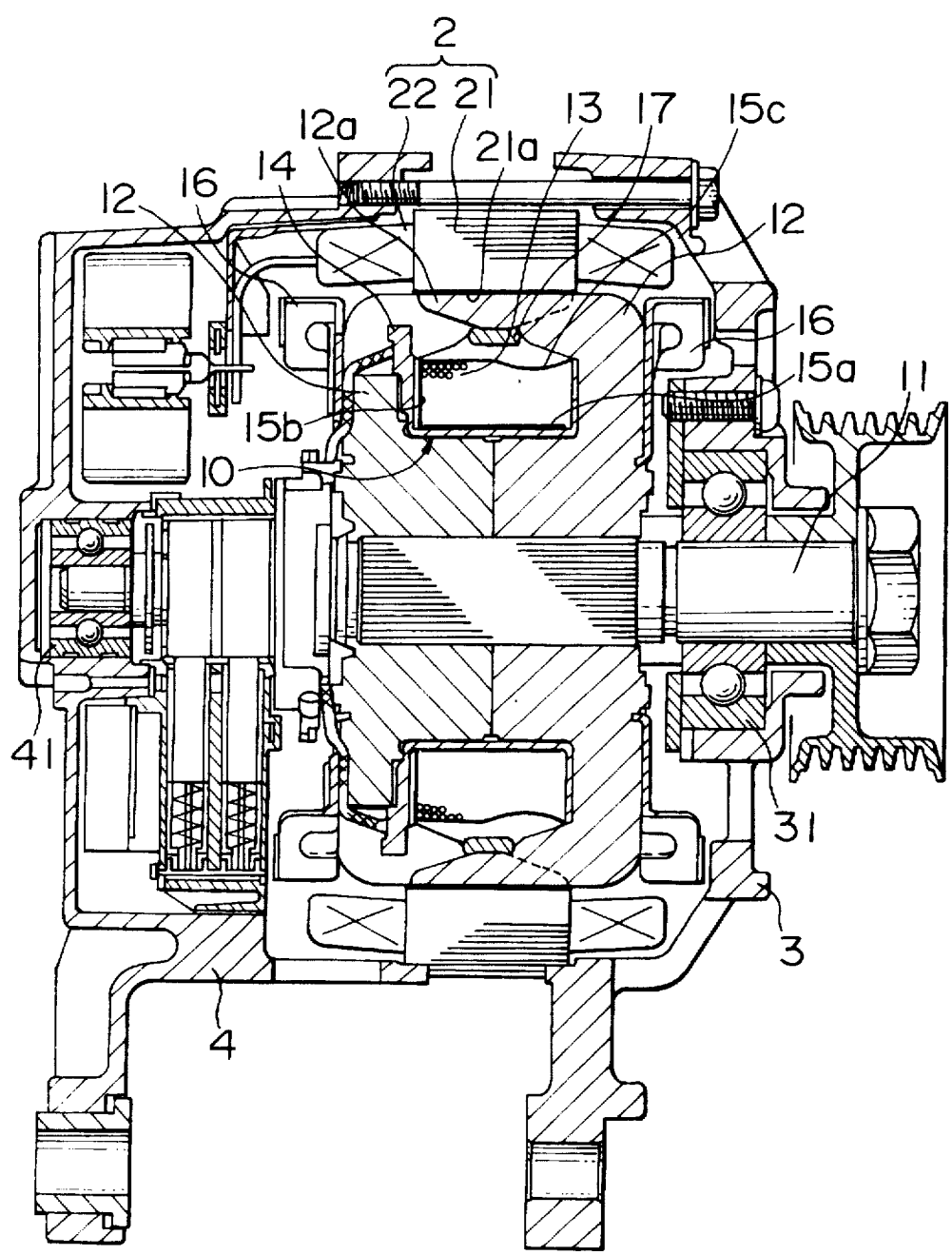
FIG. 20 is a sectional view showing a known vehicle AC generator.
Figure 21:
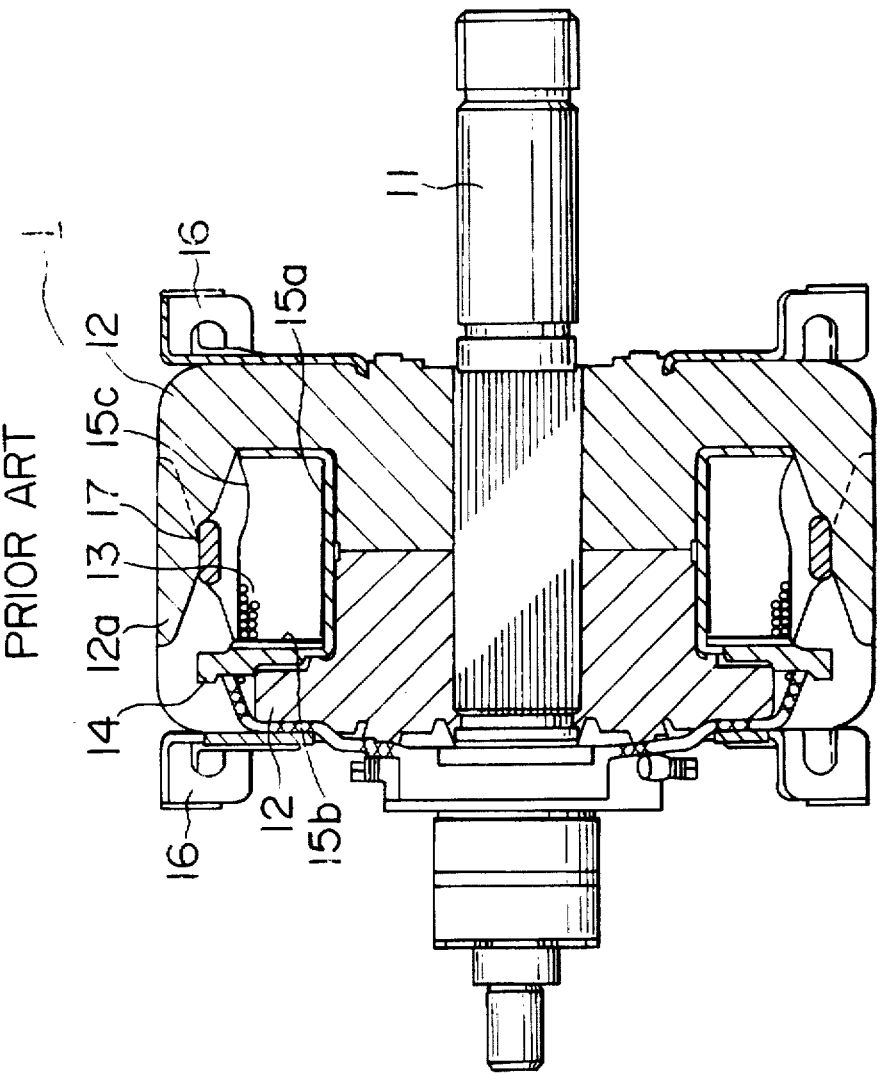
FIG. 21 is a sectional view showing a rotator for the known vehicle AC generator.
Figure 22:
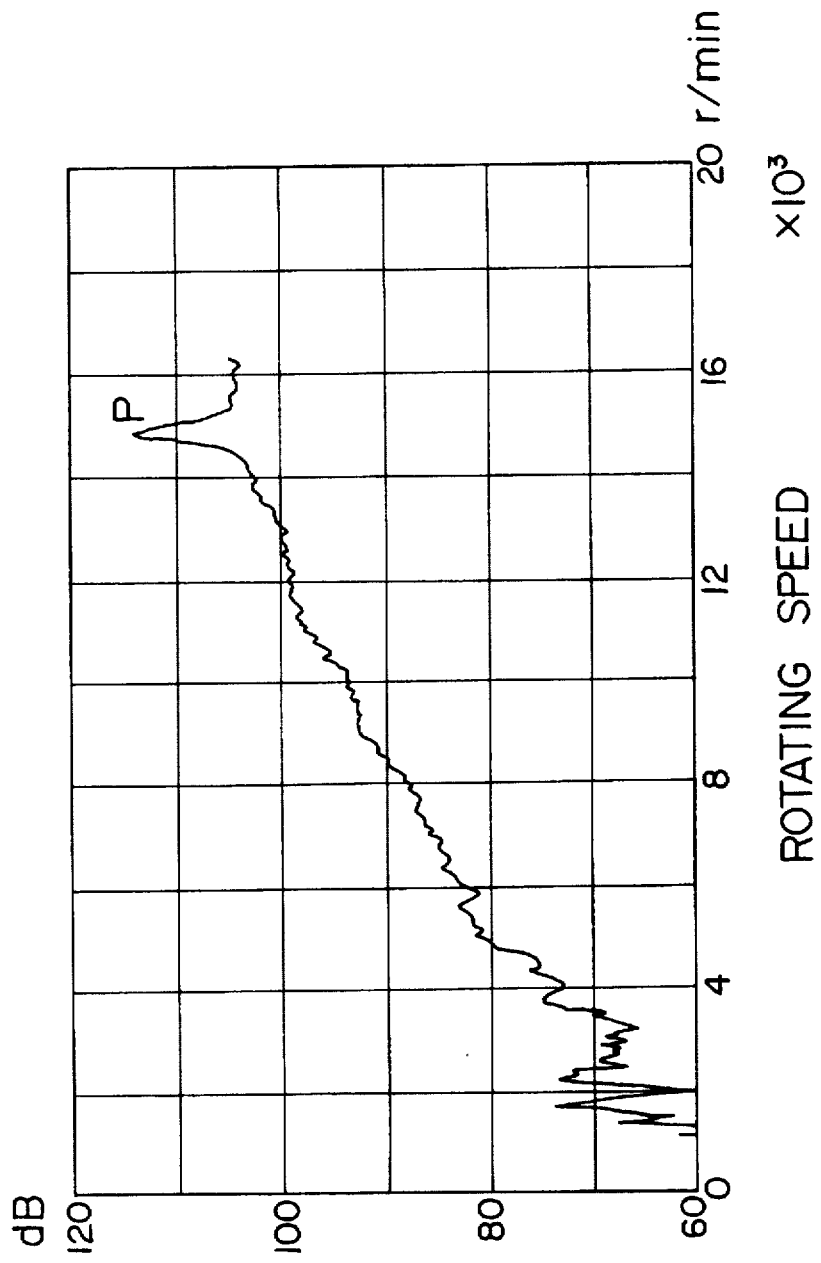
FIG. 22 is a graph indicating the noise of a vehicle AC generator having a ring in decibels.

FIG. 1 is a sectional view showing a rotator for a dynamoelectric machine of the present invention. Components identical to or equivalent to those in the rotator for a known dynamoelectric machine shown in FIGS. 20 and 21 are assigned the same reference numerals. The description of the components will be omitted. In FIG. 1, the coil frame 14 is an annular member having a square bracket-shaped section. The opening end of the square bracket-shaped section is spreading in the same manner as that in the known machine. The coil frame 14 is caught by a pair of field cores and stowed therein. The opening end of the coil frame 14 is pressing the insides of the rising edges of both the claw poles 12a.

Varnish layers 18 containing a varnish, which has a Shore hardness ranging from 30 to 80 when hardened, are formed between the coil frame 14 and field cores 12; that is, between the lateral sides of the coil frame 14 and the insides of the rising sections of the claw poles 12a. The varnish layers 18 are formed by infiltrating a melted varnish into each of gaps and then hardening the varnish.

As for a method of forming the varnish layers 18, there is such a method that after the rotator 1 is constructed, a melted varnish is dripped in a direction of an outer diameter through between the magnetic-pole pawls 12 in order to infiltrate the varnish into the gaps between the coil frame 14 and field cores 12, and then the rotator 1 is dried while being rotated in order to harden the varnish.

In the rotator for a dynamoelectric machine having the foregoing structure, in addition to the coil frame 14 that is pressing the claw poles 12a and suppressing the vibrations of the claw poles 12a, the varnish layers 18 that have an appropriate elasticity work as a shock absorber for suppressing the vibrations of the field cores 12. As a result, the vibrations of the field cores 12 are attenuated.

Figure 2:
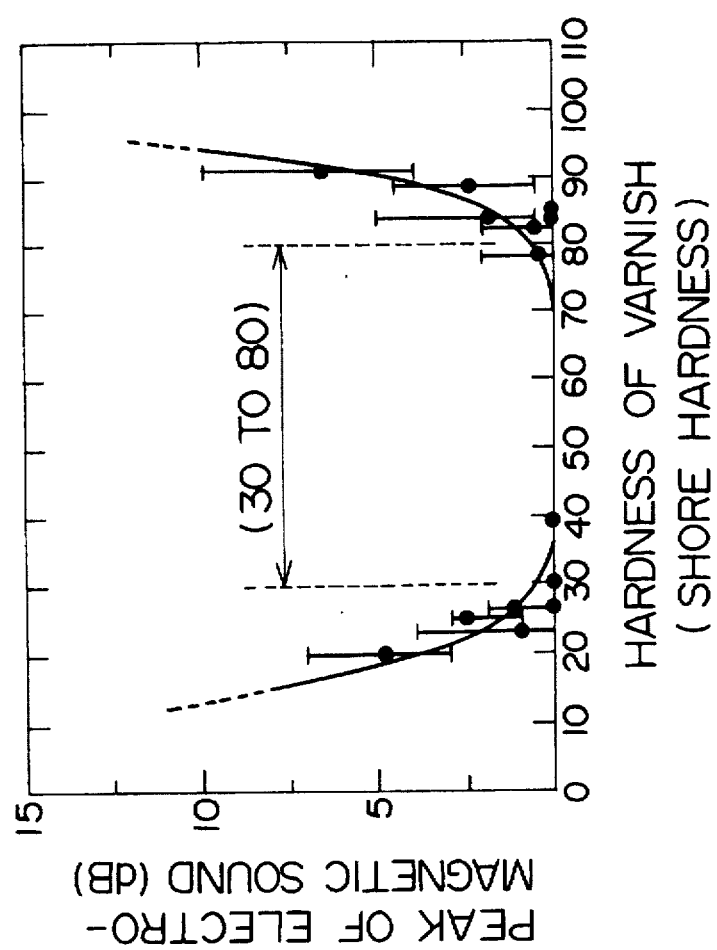
FIG. 2 is a graph expressing the relationship between the hardness of a varnish and the magnitude of a peak of an electromagnetic sound.

FIG. 2 is a graph expressing the relationship between the hardness of varnish and the magnitude of a peak P of an electromagnetic sound. The magnitude or height of a peak P of an electromagnetic sound varies depending on the hardness of varnish lying in the gaps between the coil frame 14 and field cores 12. As shown in FIG. 2, when a varnish has a Shore hardness ranging from 30 to 80, the varnish acts as a shock absorber. The magnitude of a peak P of an electromagnetic sound is therefore small. However, when a varnish has a Shore hardness of 30 or lower, the varnish is too soft to attenuate vibrations. When the Shore hardness is 80 or higher, the varnish is too hard to attenuate vibrations.

Figure 3:
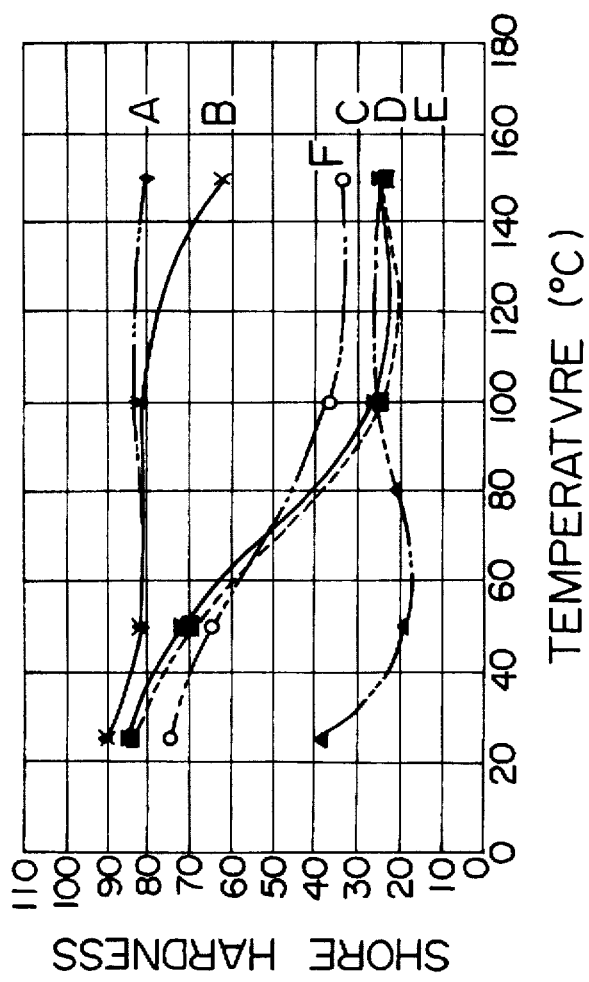
FIG. 3 is a graph indicating the temperature characteristics of varnishes.

The hardness of varnish has the temperature characteristics as those shown in FIG. 3 in relation to varnish types. Alphabets A to F denote varnish types. The hardnesses of the varnishes A to F have the temperature characteristics as those shown in the graph of FIG. 3. In the present invention, as long as a Shore hardness ranging from 30 to 80 is ensured in the range of temperatures at which a generator operates normally; that is, in the range of about 20° C. to 150° C., any varnish can be used. For example, a varnish F is therefore selected for use.

Figure 4:
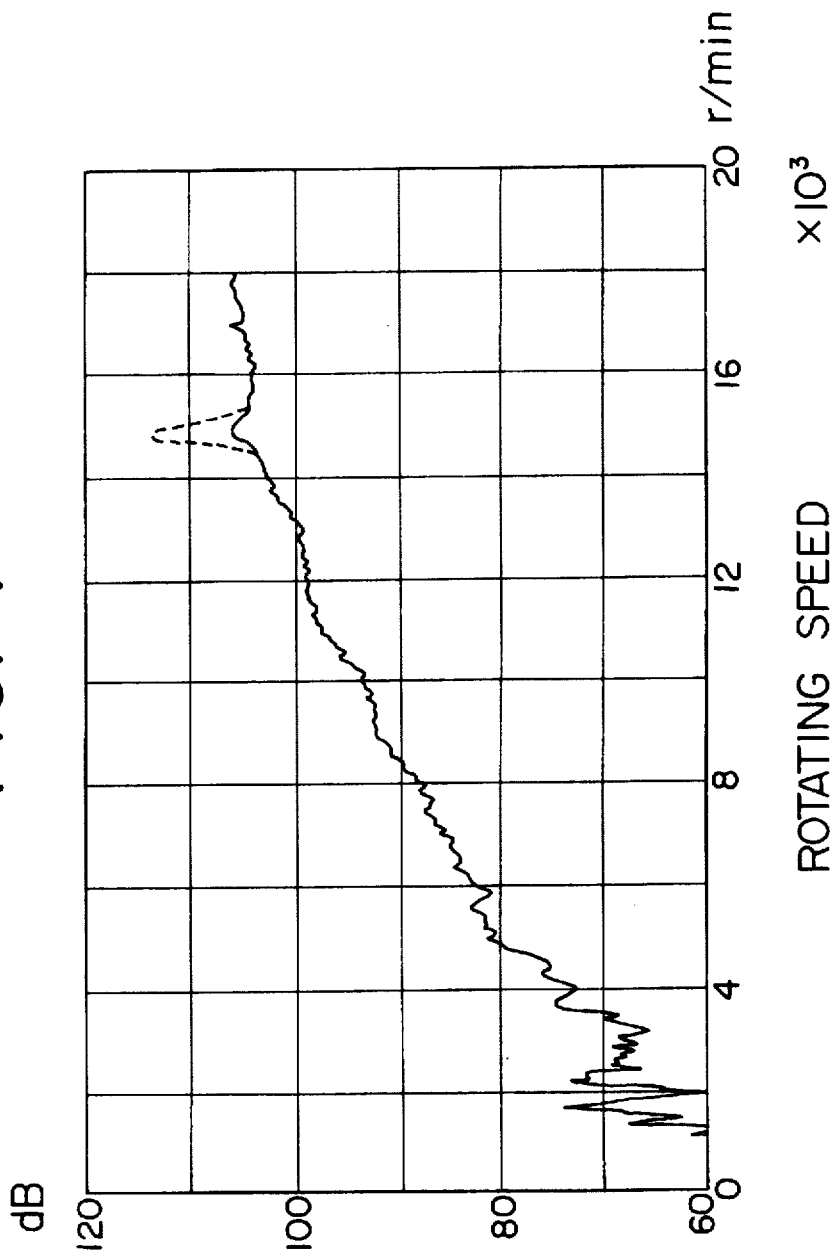
FIG. 4 is a graph indicating the noise of a vehicle AC generator, which occurs when varnish layers are interposed between a coil frame and field cores, in decibels.

FIG. 4 is a graph indicating the noise of a vehicle AC generator, which occurs when the varnish layers 18 formed with a varnish whose Shore hardness ranges from 30 to 80 are interposed between the coil frame 14 and field cores 12, in decibels. As apparent from the graph, the peak P of an electromagnetic sound is lowered. In reality, the electromagnetic sound is minimized and an annoying sound is weak.

As mentioned above, in the rotator for a dynamoelectric machine of the present invention, a high-speed electromagnetic sound can be minimized despite the simple structure. Thus, the noise of an electromagnetic sound can be minimized despite the simple structure without the necessity of increasing the number of manufacturing processes or component parts.

Second Embodiment

Figure 5:
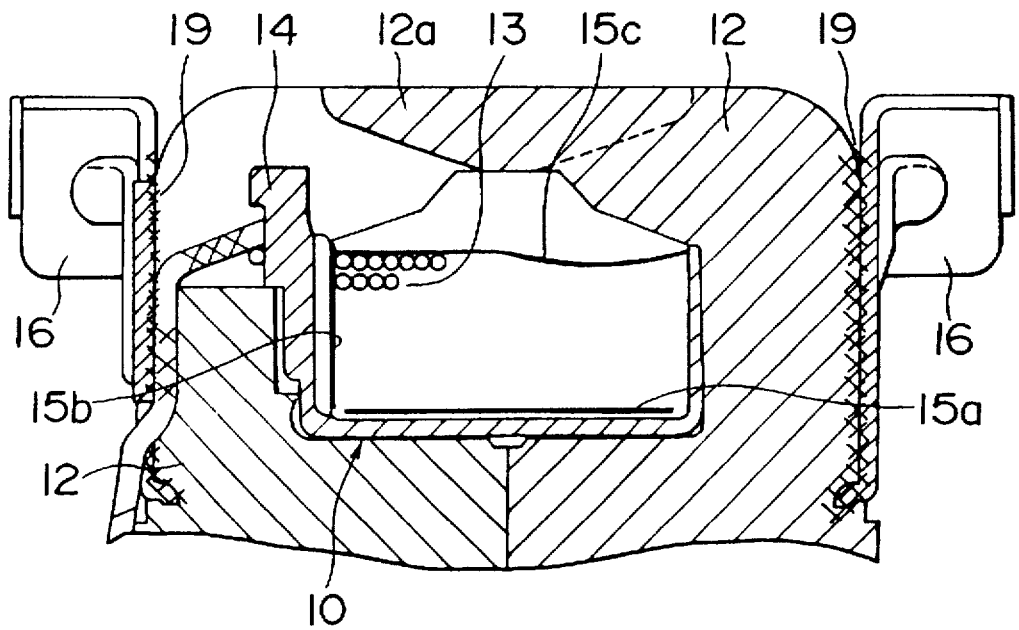
FIG. 5 is a sectional view showing another example of a rotator for a dynamoelectric machine of the present invention.

FIG. 5 is a sectional view showing another example of the rotator for a dynamoelectric machine of the present invention. In the first embodiment, varnish is infiltrated into gaps between the coil frame 14 and field cores 12. In this embodiment, varnish layers 19 formed with a varnish, which has a Shore hardness ranging from 30 to 80 when hardened, are formed between the field cores 12 and fans 16 that are regions orthogonal to the rotation axis 11.

As for a method of forming the varnish layers 19, after the fans 16 are attached to the field cores 12, varnish is dripped and infiltrated into gaps between the field cores 12 and fans 16 in a direction of an outer diameter. The rotator is then dried while being rotated, whereby the varnish is hardened. Thus, the varnish layers 19 are completed.

Alternatively, the varnish layers 19 may be formed by applying varnish to the surfaces of the fans 16 coming into contact with the fiefd cores 12. Thereafter, the surfaces of the fans 16 are internally caulked and laterally secured by projection welding. The Shore hardness of a varnish used to form the varnish layers 19 is the same as that in the first embodiment or ranges from 30 to 80. The same varnish as that employed in the varnish layers 18 may be adopted.

The foregoing structure also has the advantage of minimizing an electromagnetic sound. This structure is such that the fans 16 are attached to the claw poles 12a via the varnish layers 19 having an appropriate elasticity. Owing to the structure, when the claw poles 12a vibrate, the varnish layers 19 acts as a shock absorber for minimizing the vibrations of the claw poles 12a.

Figure 6:
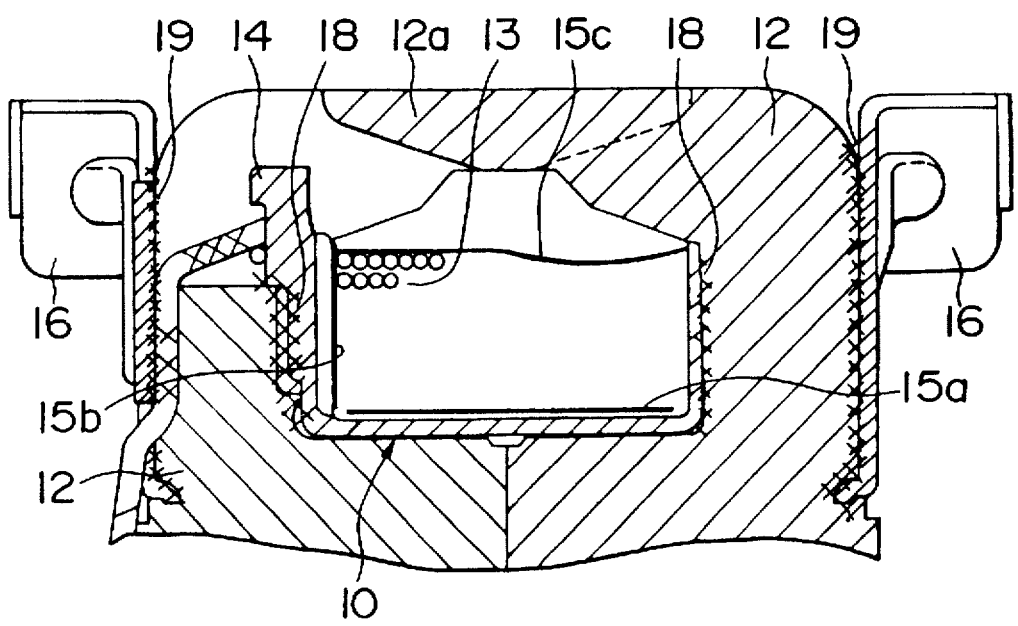
FIG. 6 is a sectional view showing another example of the rotator for a dynamoelectric machine of the present invention.

This embodiment may be combined with the first embodiment as shown in FIG. 6. In FIG. 6, the varnish layers 18 are interposed between the coil frame 14 and field cores 12, and the varnish layers 19 are interposed between the field cores 12 and fans 16. Each pair of the varnish layers 18 and varnish layers 19 fills the role of a shock absorber. The vibrations of the field cores 12 can be suppressed more effectively.

Third Embodiment

Figure 7:
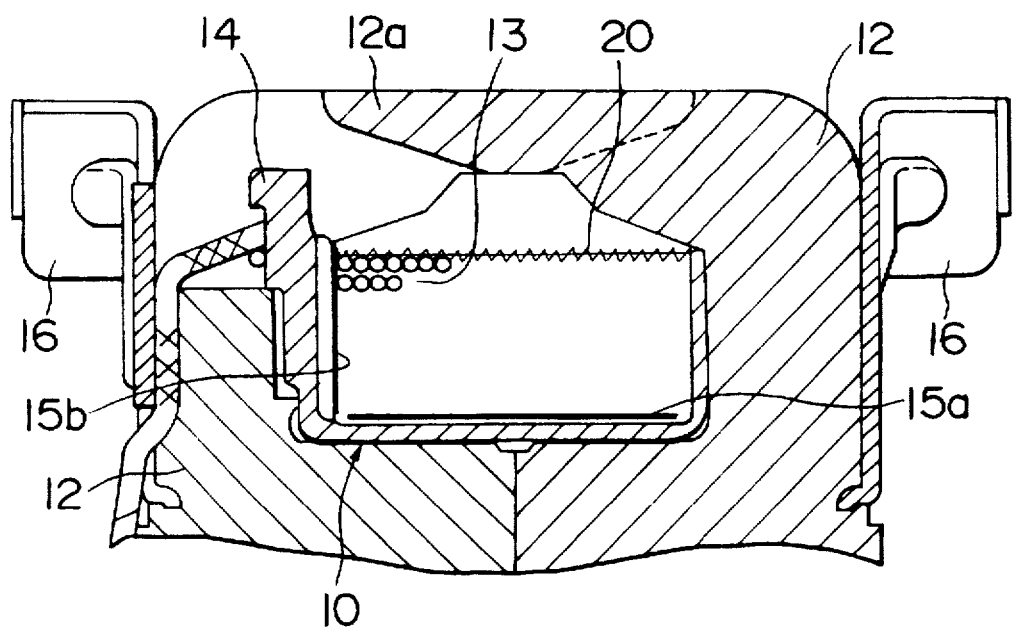
FIG. 7 is a sectional view showing another example of the rotator for a dynamoelectric machine of the present invention.

FIG. 7 is a sectional view showing another example of the rotator for a dynamoelectric machine of the present invention. In this embodiment, the tape 15c is not placed but a varnish layer 20 is formed by infiltrating varnish into the outer circumference of the field coil 13 and then hardening the varnish. As for the varnish to be infiltrated, a harder one of varnishes whose Shore hardnesses range from 30 to 80 in the range of use temperatures is used. The varnish layer 20 exerts the effect of preventing the field coil 13 from loosening on behalf of the tape 15c. Moreover, it will not take place that the heating efficiency of the field coil 13 deteriorates because of a reduced thickness of infiltrated varnish.

In the rotator for a dynamoelectric machine having the foregoing structure, in addition to the coil frame 14 that is pressing the claw poles 12a and suppressing the vibrations of the claw poles 12a, the varnish layer 20 formed by infiltrating varnish into the outer circumference of the field coil 13 acts as a shock absorber for suppressing the vibrations of the field cores 12. As a result, the vibrations of the field cores 12 are attenuated. Since varnish is spread all over the field coil 13, the varnish substitutes for the tape 15c. Consequently, a loosening-prevention tape or the like can be eliminated.

Figure 8:
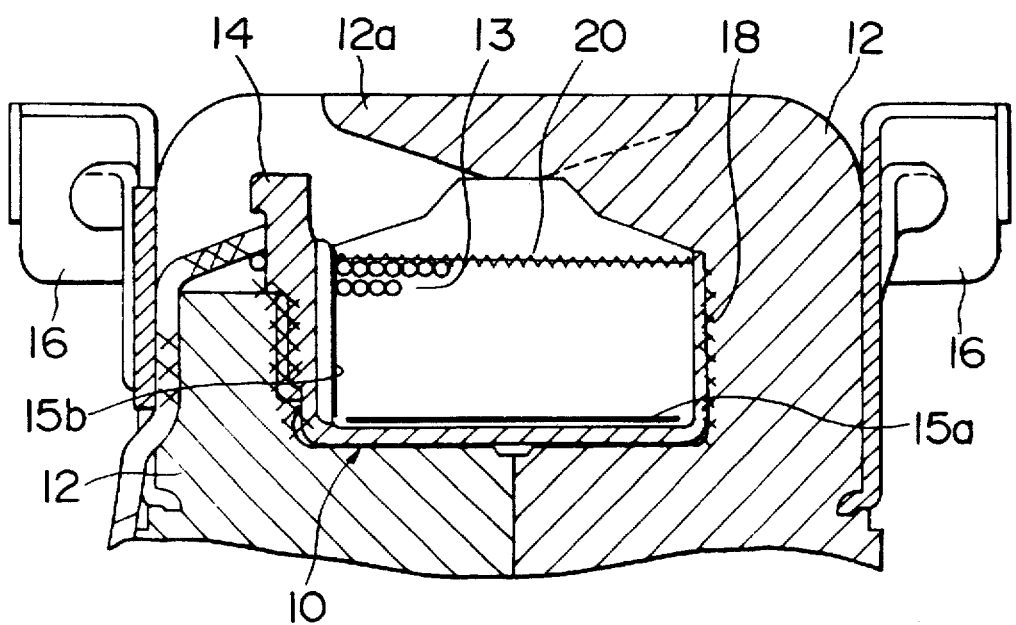
FIG. 8 is a sectional view showing another example of the rotator for a dynamoelectric machine of the present invention.
Figure 9:
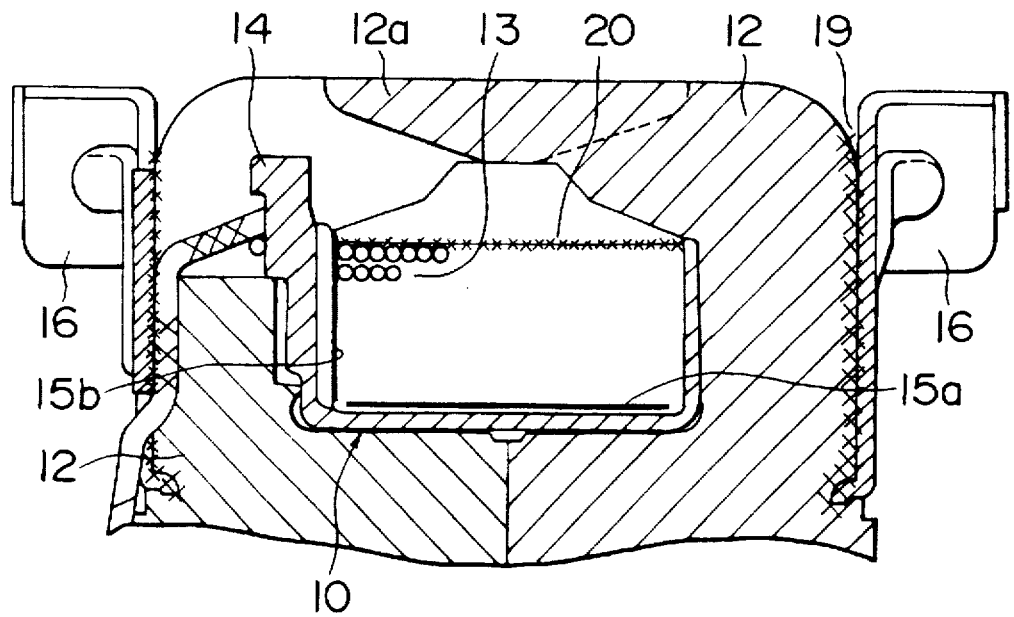
FIG. 9 is a sectional view showing another example of the rotator for a dynamoelectric machine of the present invention.
Figure 10:
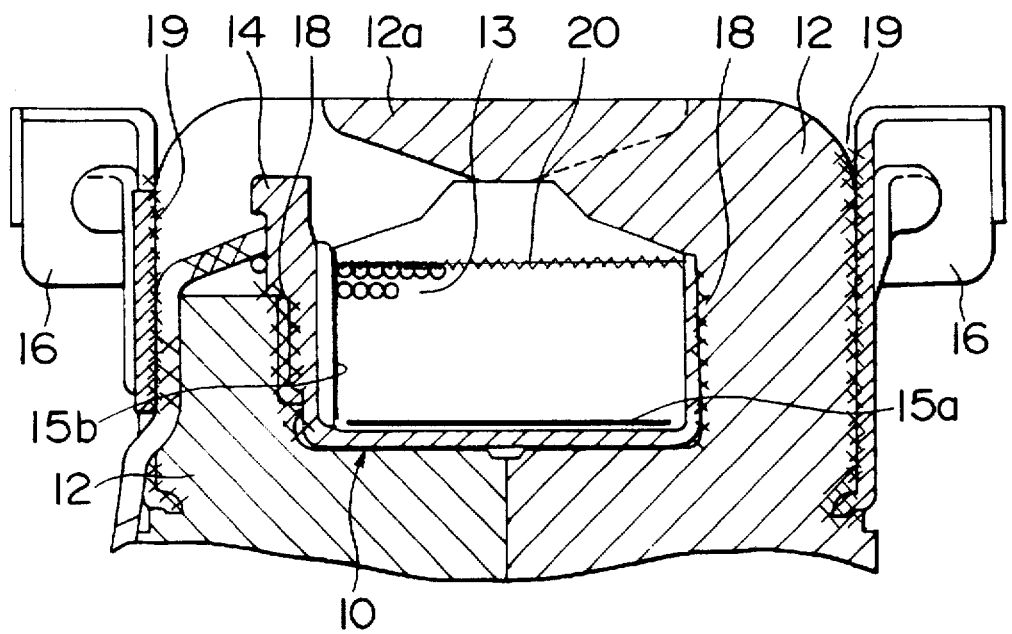
FIG. 10 is a sectional view showing another-example of the rotator for a dynamoelectric machine of the present invention.
Figure 11:
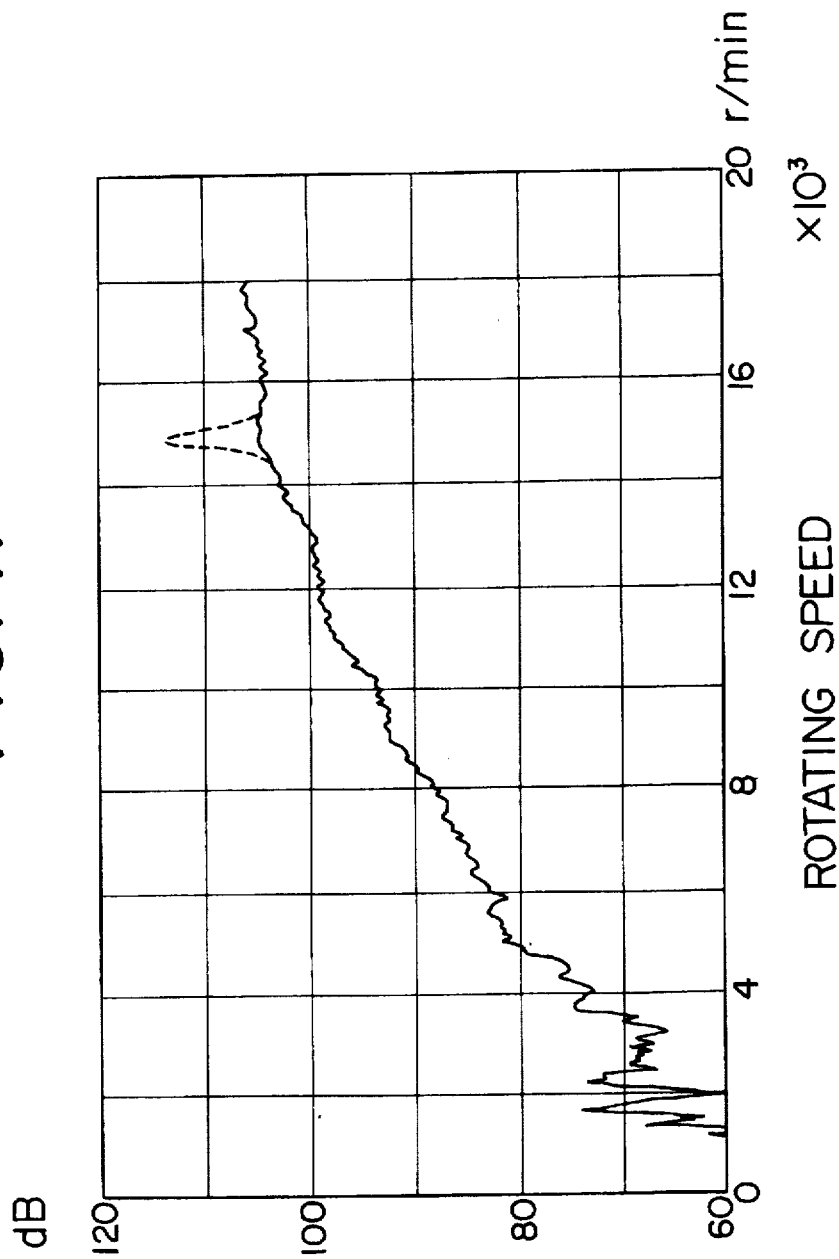
FIG. 11 is a graph indicating the noise of a vehicle AC generator, which occurs when varnish layers are formed at three positions, in decibels.

This embodiment can be combined with the first or second embodiment if necessary. FIG. 8 shows an example of a combination with the first embodiment. Specifically, the varnish layers 18 are interposed between the coil frame 14 and field cores 12, and the varnish layer 20 is placed on the outer circumference of the field coil 13. FIG. 9 shows an example of a combination with the second embodiment. Specifically, the varnish layers 19 are interposed between the field cores 12 and fans 16, and the varnish layer 20 is placed on the outer circumference of the field coil 13. FIG. 10 shows an example in which varnish layers are formed in all of three places; that is, between the coil frame 14 and field cores 12, between the field cores 12 and fans 16, and on the outer circumference of the field coil 13. With the combination of these different shock absorbers, the vibrations of the field cores can be prevented more reliably. FIG. 11 is a graph indicating the noise of a vehicle AC generator, which occurs when varnish layers are formed at the three places, in decibels. As apparent from the graph, the peak P of an electromagnetic sound is substantially indiscernible. In reality, the electromagnetic sound is minimized and an annoying sound is hardly heard. The varnishes applied to the three positions may be of the same type or of different types.

Fourth Embodiment

Figure 12:
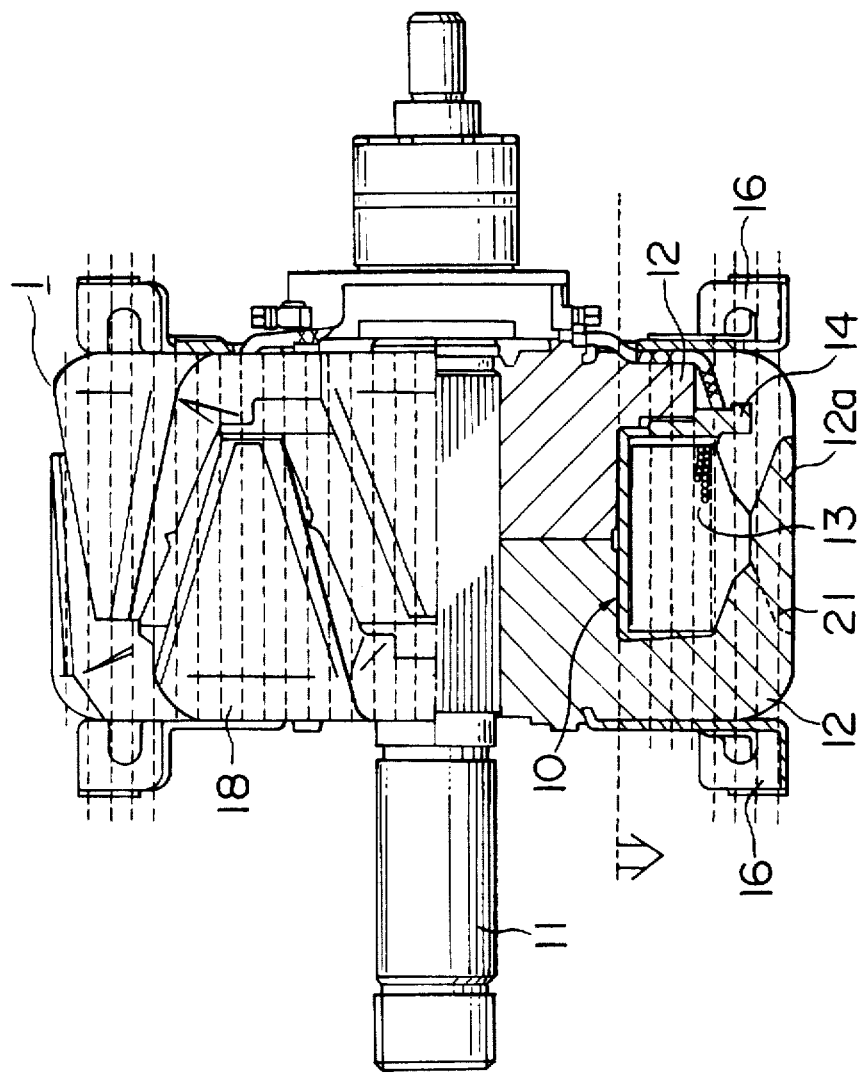
FIG. 12 is a sectional view showing another example of the rotator for a dynamoelectric machine of the present invention.

FIG. 12 is a sectional view showing another example of the rotator for a dynamoelectric machine of the present invention. In this embodiment, a varnish 21, which has a Shore hardness ranging from 30 to 80 when hardened at a use temperature of the dynamoelectric machine, is spread all over the outer-circumference portion of the rotator beyond the inner circumference of the coil frame 14. This can be achieved according to the following method: after the rotator 1 is constructed, a portion below a dashed line in FIG. 12 or a portion extending in a direction of an arrow from the dashed line in FIG. 12 is immersed in a varnish vessel that is not shown; the rotator is then rotated with the rotation axis 11 as a center while the immersed height is being kept unchanged; the varnish is thus spread all over the circumference of the rotator 1; and then the rotator is dried at a high temperature in order to harden the varnish.

Thus, all varnish layers formed over the outer circumferences of the field cores 12 act as shock absorbers. Consequently, the vibrations of the field cores 12 can be suppressed. At the same time, the tapes 15a, 15b, and 15c can be excluded. In this embodiment, the manufacturing work for infiltrating varnish requires only a short period of time. The process of placing the tapes 15a, 15b, and 15c can be eliminated.

Fifth Embodiment

FIGS. 13 to 19 are sectional views showing other examples of the rotator for a dynamoelectric machine of the present invention. In this embodiment, varnish is not infiltrated into gaps among regions, but nonwoven fabrics moistened with varnish are inserted into the gaps. A nonwoven fabric made by arranging fibers irregularly or tangling the fibers in the course of application of an adhesive, heating and pressurizing, or sewing; such as, felt can be employed.

Figure 13:
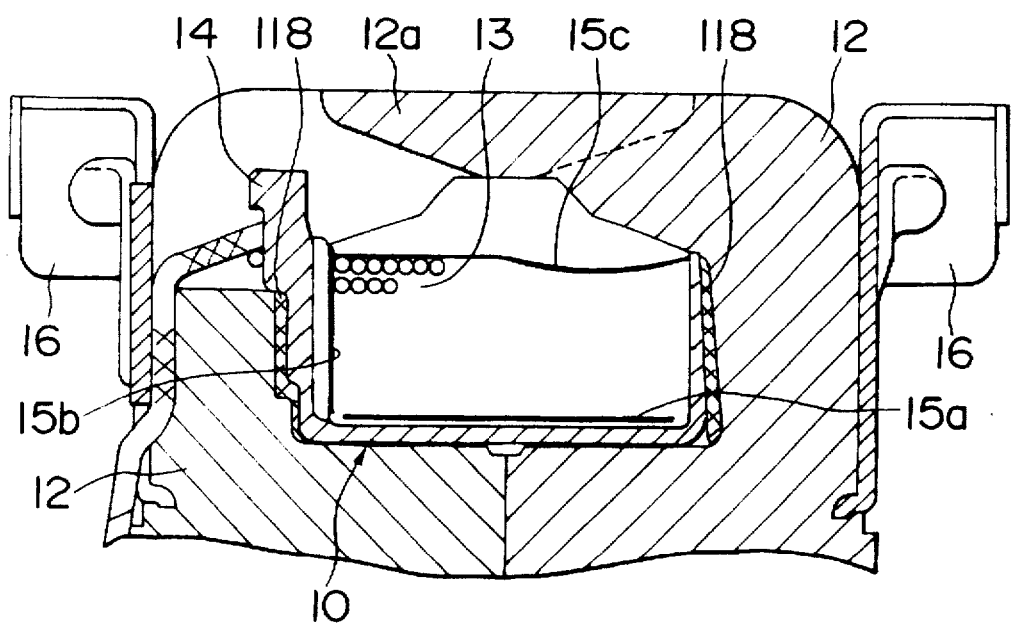
FIG. 13 is a sectional view showing another example of the rotator for a dynamoelectric machine of the present invention.
Figure 14:
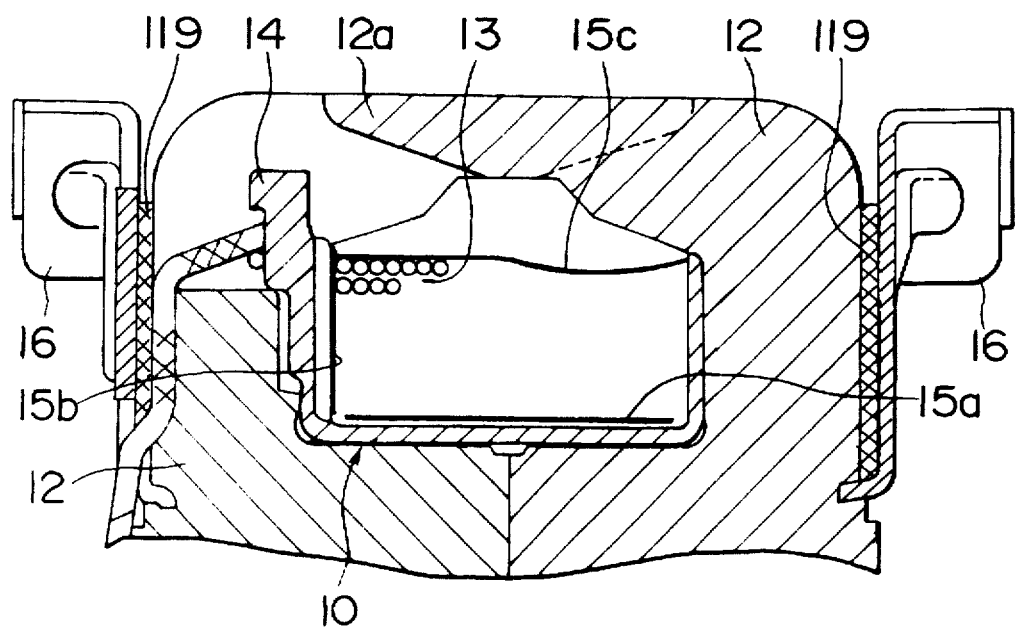
FIG. 14 is a sectional view showing another example of the rotator for a dynamoelectric machine of the present invention.
Figure 15:
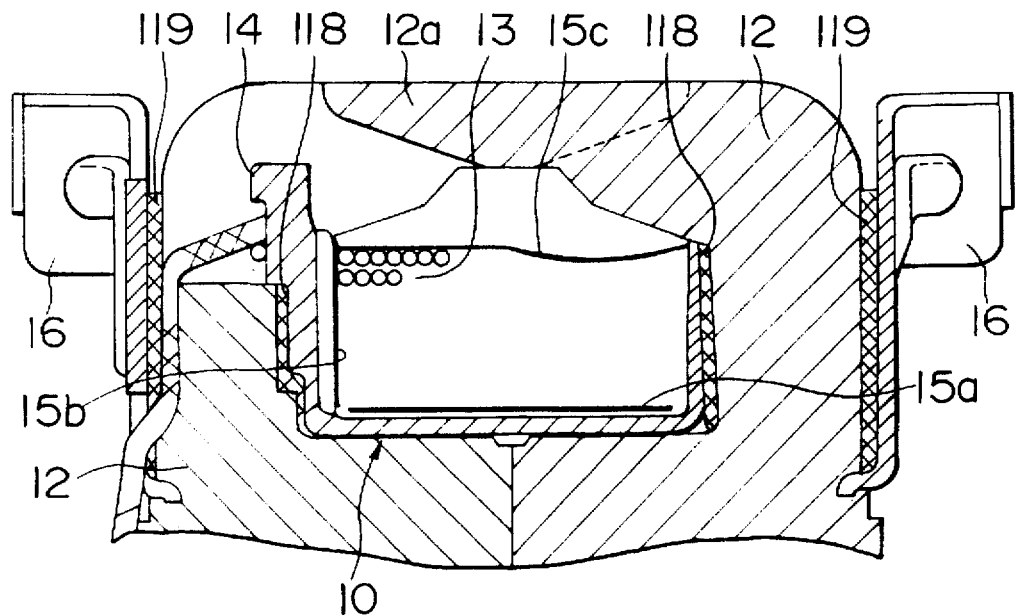
FIG. 15 is a sectional view showing another example of the rotator for a dynamoelectric machine of the present invention.
Figure 16:
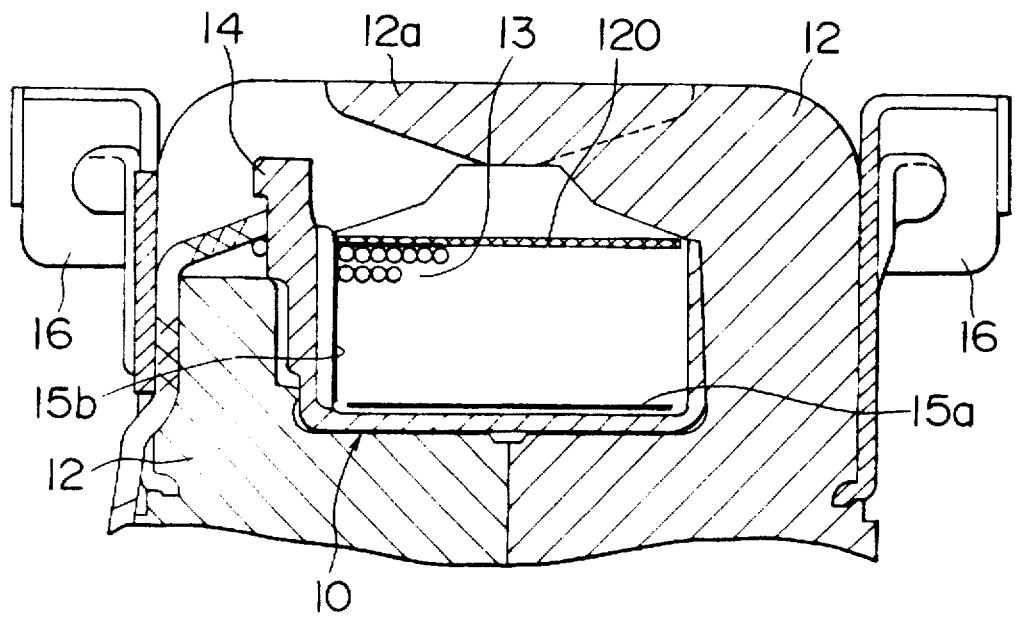
FIG. 16 is a sectional view showing another example of the rotator for a dynamoelectric machine of the present invention.
Figure 17:
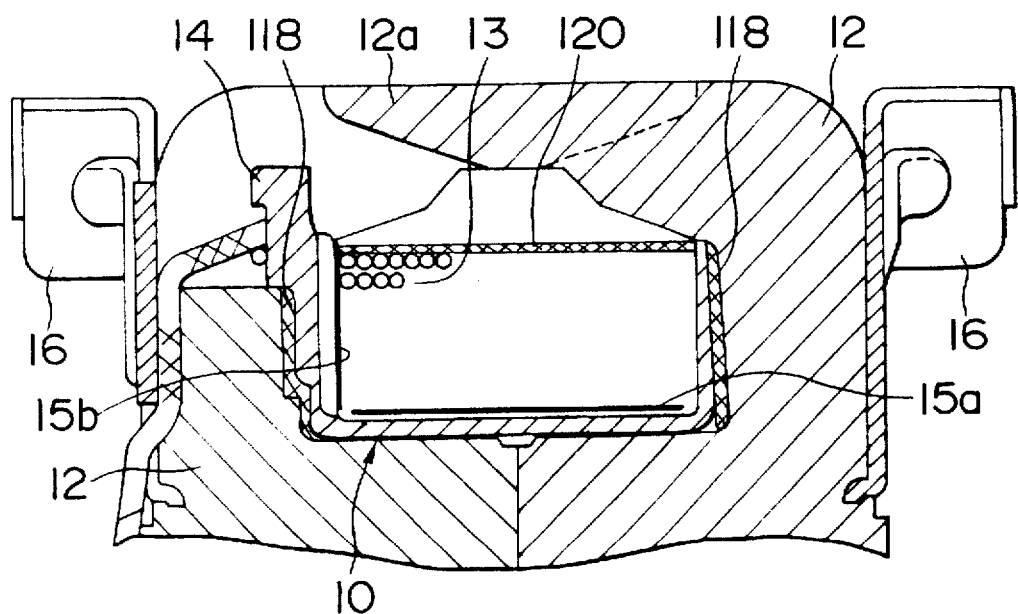
FIG. 17 is a sectional view showing another example of the rotator for a dynamoelectric machine of the present invention.
Figure 18:
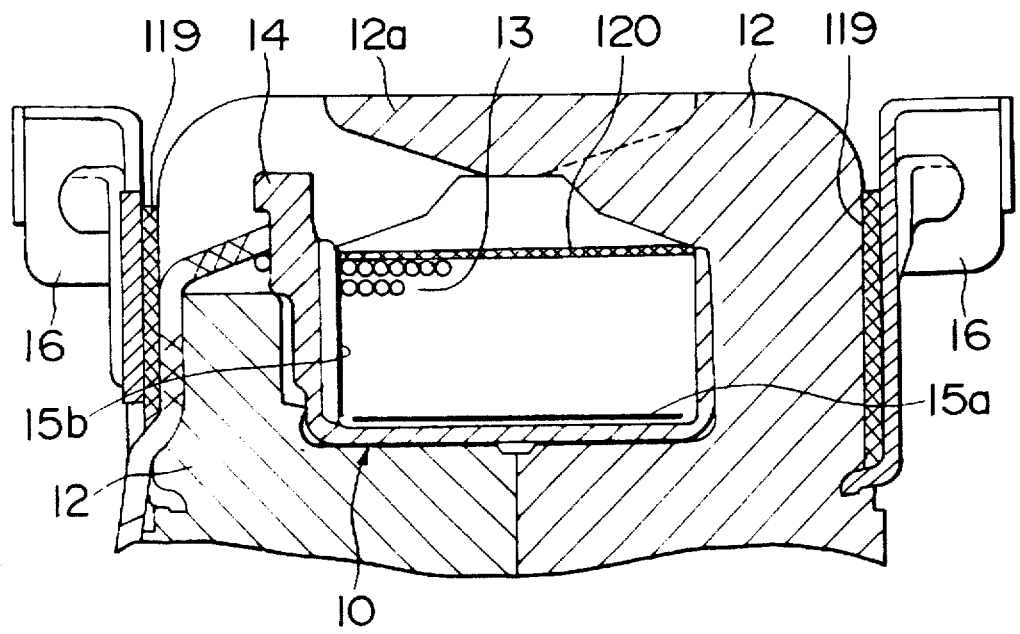
FIG. 18 is a sectional view showing another example of the rotator for a dynamoelectric machine of the present invention.
Figure 19:
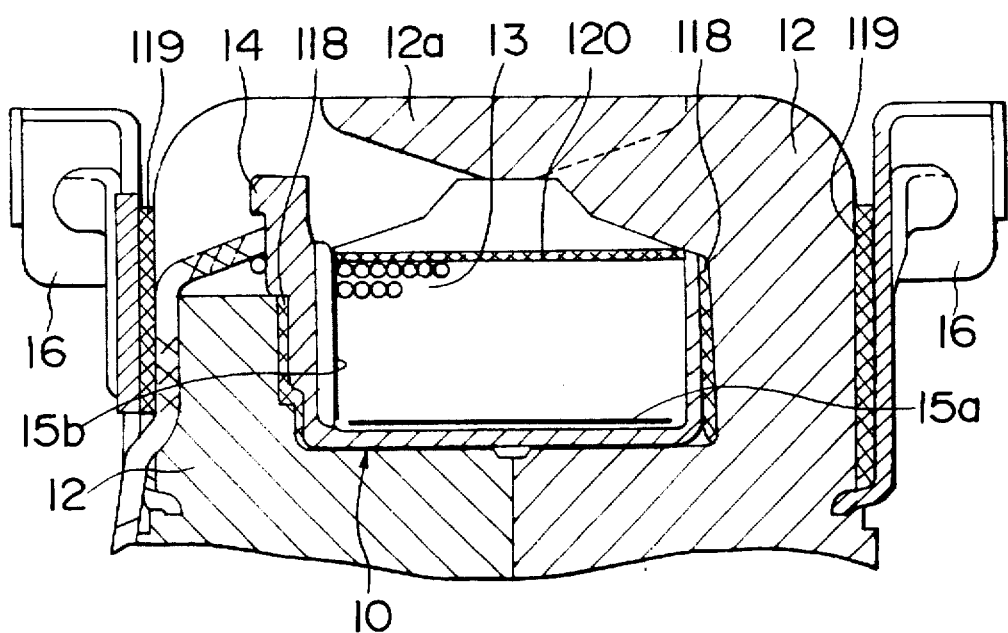
FIG. 19 is a sectional view showing another example of the rotator for a dynamoelectric machine of the present invention.

In the rotators of the first to fourth embodiments, varnish is not infiltrated into gaps among regions but nonwoven fabrics moistened with varnish of a type that has a Shore hardness ranging from 30 to 80 when hardened are inserted into the gaps. For example, FIG. 13 shows an example in which nonwoven fabrics 118 are interposed between the lateral sides of the coil frame 14 and the insides of the rising sections of the claw poles 12a. FIG. 14 shows an example in which nonwoven fabrics 119 are interposed between the field cores 12 and fans 16. FIG. 15 shows an example in which the nonwoven fabrics 118 and 119 are placed in the above two places. FIG. 16 shows an example in which a nonwoven fabric 120 is placed on the outer circumference of the field coil 13. FIG. 17 shows an example in which the nonwoven fabrics 118 and nonwoven fabric 120 are placed. FIG. 18 shows an example in which the nonwoven fabrics 119 and nonwoven fabric 120 are placed. FIG. 19 shows an example in which the nonwoven fabrics 118, nonwoven fabrics 119, and nonwoven fabric 120 are placed.

Thus, the nonwoven fabrics moistened with varnish act as shock absorbers. The same advantages as those provided by the first to fourth embodiments are made available. In an example in which nonwoven fabrics moistened with varnish are employed, parts are assembled with nonwoven fabrics attached in a process of constructing the rotator 1. Only the work of attaching the nonwoven fabrics should be added to the construction sequence for the rotator 1. This process of work is simpler than the process of dripping varnish directly or the process of immersing the rotator in a varnish vessel.

What is claimed is:

1. A method of manufacturing a rotator for a dynamoelectric machine, comprising:

a step of arranging a pair of field cores having a plurality of claw-like magnetic poles on the outer circumference thereof so that said pair of field cores can catch a coil frame and said claw-like magnetic poles can alternately mesh with one another;

a step of suppressing vibrations of said plurality of claw-like magnetic poles, said suppressing step further comprising:

a step of dripping varnish into gaps between said field cores and lateral sides of said coil frame, to thereby form varnish only in the vertical plane; and a step of hardening said varnish.

2. A method of manufacturing a rotator for a dynamoelectric machine according to claim 1, wherein said varnish is of a type that has a Shore hardness ranging from 30 to 80 when hardened.

* * * * *